United States Patent [19]

Gregalis

[11] Patent Number: 5,092,615
[45] Date of Patent: Mar. 3, 1992

[54] COLLAPSIBLE BEACH TABLE DOLLY AND SLED

[76] Inventor: Donald C. Gregalis, P.O. Box 852, North Adams, Mass. 01247

[21] Appl. No.: 588,028

[22] Filed: Sep. 24, 1990

[51] Int. Cl.⁵ .................................. B62B 3/02
[52] U.S. Cl. .......................... 280/30; 108/13; 280/8; 280/19; 280/651
[58] Field of Search ............. 280/30, 32, 35, 43.11, 280/47.34, 79.11, 651, 8, 18, 19; 248/11, 13; 108/11, 13

[56] References Cited

U.S. PATENT DOCUMENTS

| | | | |
|---|---|---|---|
| 63,533 | 4/1867 | Langworthy | 280/30 |
| 128,819 | 8/1941 | Gambs | 280/8 X |
| 133,261 | 11/1872 | Sellers et al. | 280/8 |
| 185,014 | 12/1876 | Brooks | 280/30 |
| 189,706 | 4/1877 | Day | 280/30 |
| 302,099 | 7/1884 | Carrara | 280/8 |
| 315,616 | 4/1885 | Harper | 280/8 |
| 334,925 | 1/1886 | Babcock | 280/8 |
| 342,215 | 5/1886 | McCormick | 280/8 |
| 349,152 | 9/1886 | Ferguson | 280/8 |
| 383,190 | 5/1888 | Reynolds | 280/9 |
| 402,340 | 4/1889 | Martin | 280/9 |
| 404,991 | 6/1889 | Smith | 280/19 |
| 471,639 | 3/1892 | Horstmannshoff | 280/8 |
| 641,113 | 1/1900 | Ingells | 280/11 |
| 819,053 | 5/1906 | Firestone | 280/79.5 X |
| 962,266 | 6/1910 | Somsen | 280/8 |
| 984,941 | 2/1911 | Larkins | 280/19 |
| 1,082,132 | 12/1913 | Meagher | 280/30 X |
| 1,158,601 | 11/1915 | Warlick | 280/30 |
| 1,335,572 | 3/1920 | Foans | 280/30 |
| 1,345,322 | 6/1920 | Foans | 280/30 |
| 1,429,926 | 9/1922 | Carre | 280/30 |
| 1,501,271 | 7/1924 | Colson | 280/8 |
| 1,524,563 | 1/1925 | Lang | 280/8 |
| 2,063,627 | 12/1936 | Ruf | 280/8 |
| 2,394,245 | 2/1946 | Koller | 280/30 X |
| 2,433,246 | 12/1947 | Stelzer | 280/8 |
| 2,577,459 | 12/1951 | Gellenbeck | 280/8 |
| 2,603,500 | 7/1952 | Messier | 280/30 |
| 2,611,417 | 9/1952 | Henry et al. | 280/30 X |
| 2,649,982 | 8/1953 | Ray | 280/8 X |
| 2,730,372 | 1/1956 | Mahr | 280/30 |
| 2,751,233 | 6/1956 | Racker | 280/30 X |
| 2,849,241 | 8/1958 | Owen, Sr. | 280/8 |
| 2,862,720 | 12/1958 | Stone et al. | 280/30 X |
| 2,926,021 | 2/1960 | Altadonna | 280/11 |
| 2,967,058 | 1/1961 | Hoffmann | 280/30 |
| 3,046,031 | 7/1962 | Reynolds | 280/30 |
| 3,100,364 | 8/1963 | May | 280/30 X |
| 3,180,654 | 4/1965 | Westfall | 280/30 |
| 3,386,749 | 6/1968 | Roudanez | 280/8 X |
| 3,463,502 | 8/1969 | Gough | 280/8 |
| 3,540,614 | 11/1970 | Flagg | 280/47.34 |
| 3,669,464 | 6/1972 | Linzmeier | 280/47.34 |
| 3,693,993 | 9/1972 | Mazzarelli et al. | 297/118 X |
| 3,837,663 | 9/1974 | Ness | 280/8 |
| 3,912,290 | 10/1975 | Rich | 280/9 |
| 3,927,894 | 12/1975 | Zawislak | 280/8 |
| 4,106,590 | 8/1978 | Tarran | 182/20 |
| 4,316,615 | 2/1982 | Willette | 280/47.26 |
| 4,471,969 | 9/1984 | Zabala et al. | 280/30 |
| 4,703,944 | 11/1987 | Higson | 280/30 |
| 4,771,871 | 9/1988 | Lambracht | 190/18 A X |

Primary Examiner—Andres Kashnikow
Assistant Examiner—Michael Mar
Attorney, Agent, or Firm—Kenton L. Freudenberg; Maxwell C. Freudenberg

[57] ABSTRACT

A combined collapsible beach table, dolly and sled structure having a flat smooth table-top surface slidable over a sandy beach when the table is inverted and having recessed wheels with rolling surfaces projecting only slightly from the sliding surface to rollably support the inverted structure on a hard smooth surface. A pair of folding dual-leg members are extended to support the structure as a table and to retain loads thereon when the structure is inverted and used as a sled or dolly. The dual-leg members are folded against the table top to form a compact storable structure. A detachable pulling handle is storable in the compact folded structure.

20 Claims, 3 Drawing Sheets

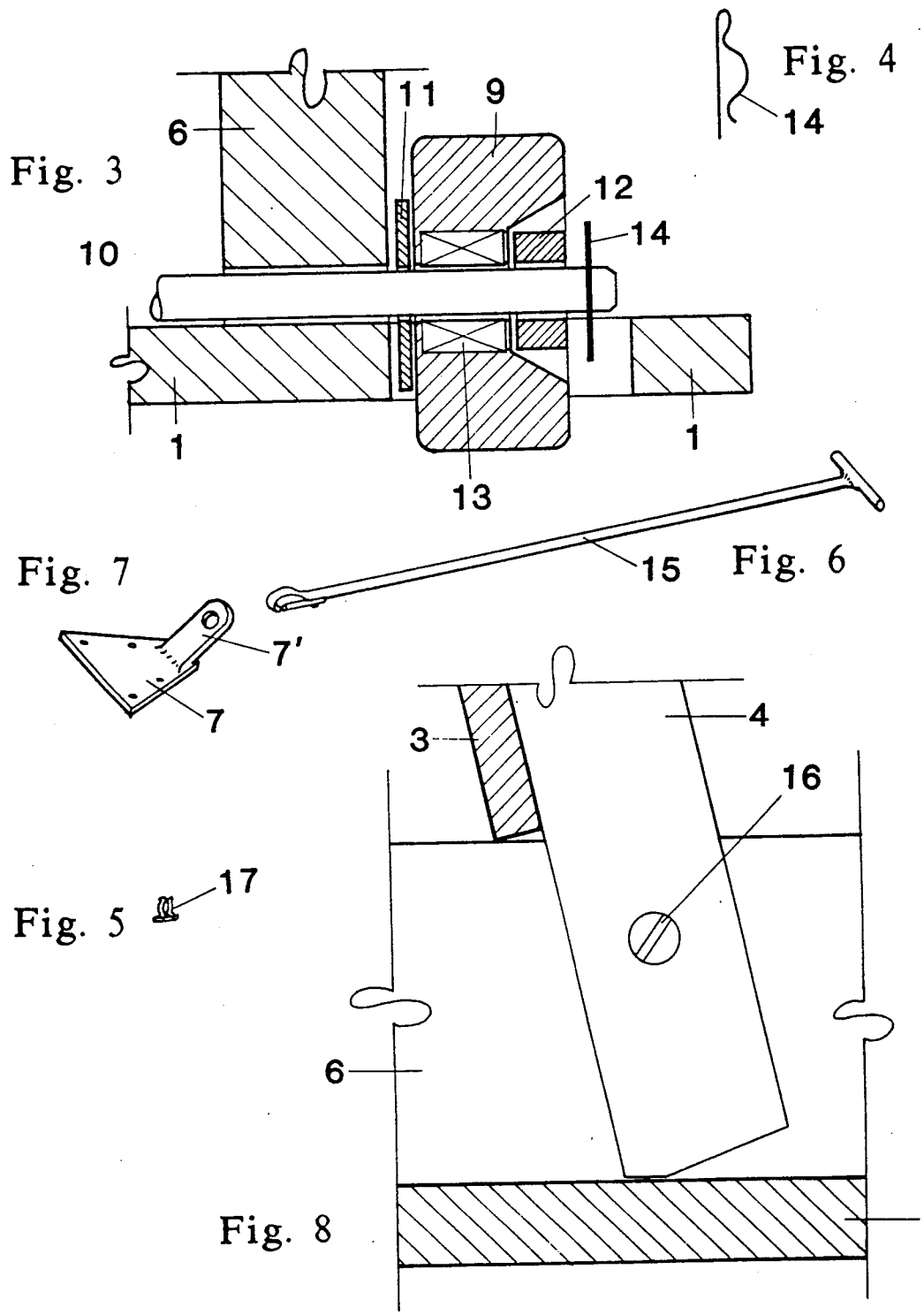

COLLAPSIBLE BEACH TABLE DOLLY AND SLED

BACKGROUND OF THE INVENTION

Persons visiting beach areas often carry with them a variety of equipment and supplies which may be both heavy and awkward to handle while traversing pavement, walkway, stair and sandy beach surfaces and which preferably are most conveniently used by setting some of the equipment or supplies on a table top. The present invention provides a combined table/dolly/sled carrier structure which can be conveniently used to transport a variety of equipment and supplies in such a situation.

SUMMARY OF THE INVENTION

In accordance with the present invention a wooden table structure having legs suitable for supporting it on a sandy beach has incorporated therein a plurality of relatively small diameter recessed wheels which project only slightly above the broad smooth flat top surface of the table whereby when the table is inverted, the top surface provides a sliding surface for sliding it upon a sandy surface and the wheels provide rolling support on a hard walkway or sheet surface while this carrier structure transports equipment or supplies thereon over such surfaces. Except for the slight projection of the wheels above the broad smooth flat surface of the structure, this surface is unobstructed. The recessed wheels provide minimal interference with the sliding movement of the structure when it is used as a sled on a sandy surface. The wheels are supported in apertures in the top surface and may be the same type of wheels used on skateboards or rollerskates, and which are typically constructed from a resilient abrasion resistant polyurethane plastic material. The wheels are easily manually removable to further minimize any obstruction of the top surface when the structure is used as a table. A rigid handle is detachably connected at one end of the structure to pull the structure in its transporting mode of use. To facilitate movement of heavy loads on hard surfaces the wheels at one end of the structure may be mounted to swivel using conventional small swiveling casters. The table legs are hingedly mounted relative to the table top so they can be compactly folded against the top for storage or transporting the table in the trunk of an automobile. The leg assemblies in their extended positions serve as front and rear stops to help retain loads on the carrier during transporting of the loads. The removable handle is stored in clips at the underside of the table when not in use.

It is an object of the invention to provide a multipurpose transporting device for movement of material over both loose granular and hard flat surfaces.

It is a further object of the present invention to provide such a multipurpose device which can also function as a table on a sandy beach or other surface.

Another object of the invention is to provide a transporting device which is useful around a home for transporting heavy objects as in a basement.

Still another object of the invention is to provide a device which is useful in carrying heavy or awkward loads to and from an ice fishing site on a frozen lake which may be partially snowcovered.

A further object of the invention is to provide a transporting device which is low cost and made of relatively few simple or off the shelf parts.

DESCRIPTION OF THE DRAWINGS

FIG. 3 is a section taken through a wheel mounting assembly parallel to the wheel axis.

FIG. 4 is a view of a spring clip for retaining a wheel on the end of its axle as seen in FIG. 3.

FIG. 5 is a perspective view of a clip used for storage of a handle beneath the table top.

FIG. 6 is a perspective view of a detachable handle for pulling the structure as seen in FIG. 1.

FIG. 7 is a perspective view of a bracket secured to the underside of the table top at one end for attachment of a pulling handle.

FIG. 8 is a section showing a portion of the upper left leg structure of FIG. 1 in which the leg is in its extended position.

DESCRIPTION OF THE PREFERRED EMBODIMENT

Figure 1:
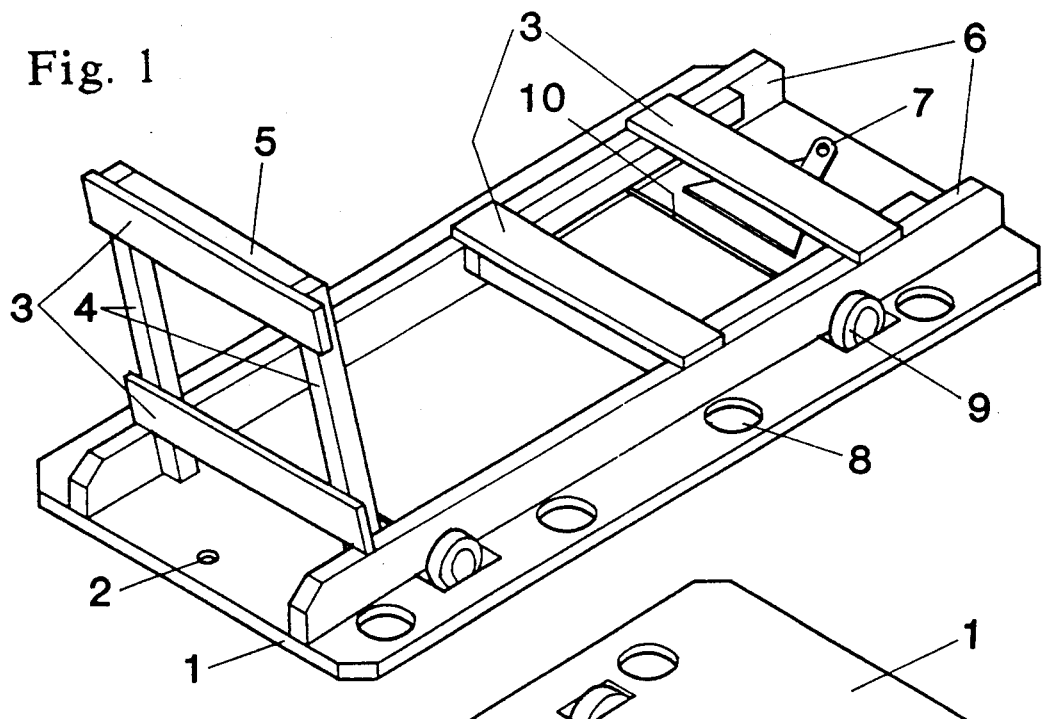
FIG. 1 is a perspective view of a sled/dolly/table device in a position for carrying a load by sliding or rolling movement over a supporting surface.
Figure 2:
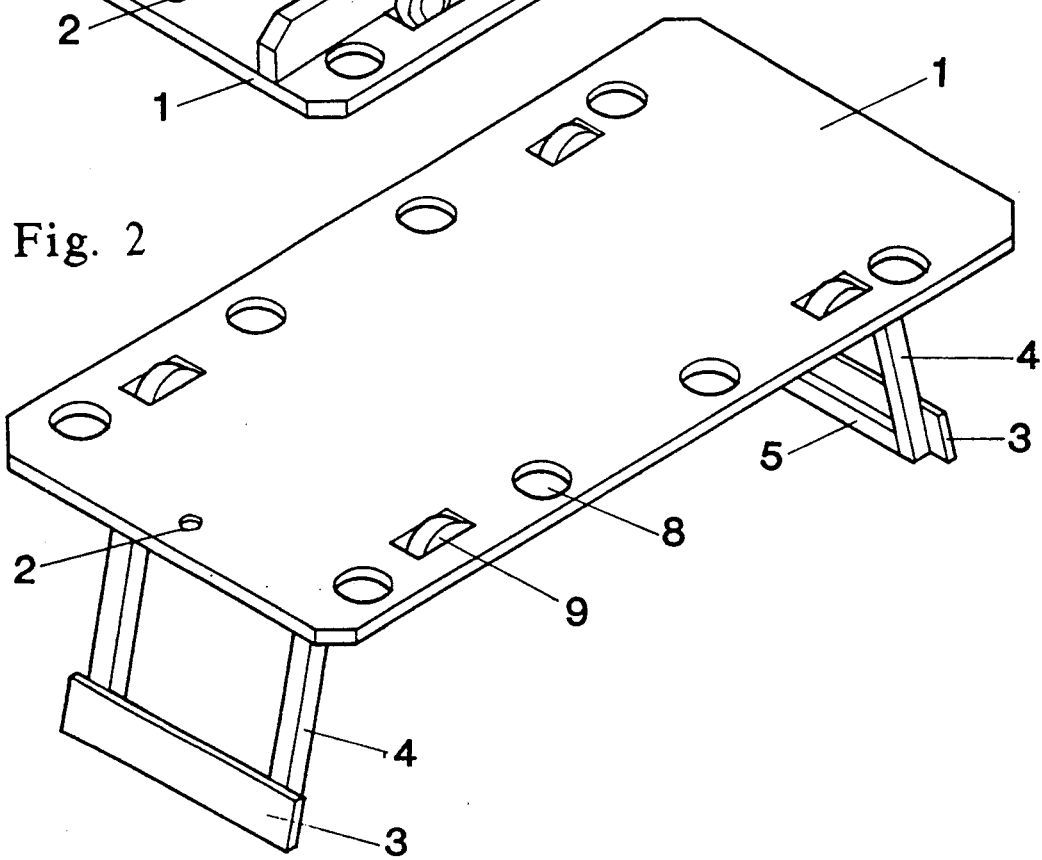
FIG. 2 is a perspective view of the sled/dolly/table device arranged for use as a table.
Figure 9:
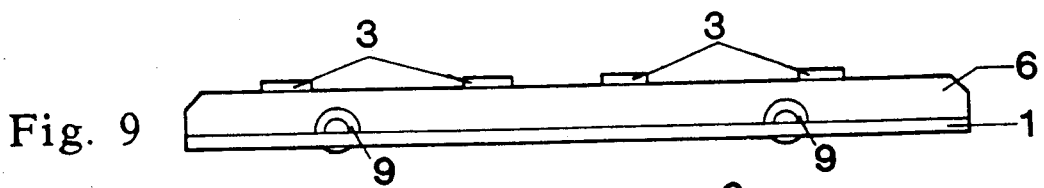
FIG. 9 is a side view of the sled/dolly/table device with the wheels and smooth surface of the table at the underside.
Figure 10:
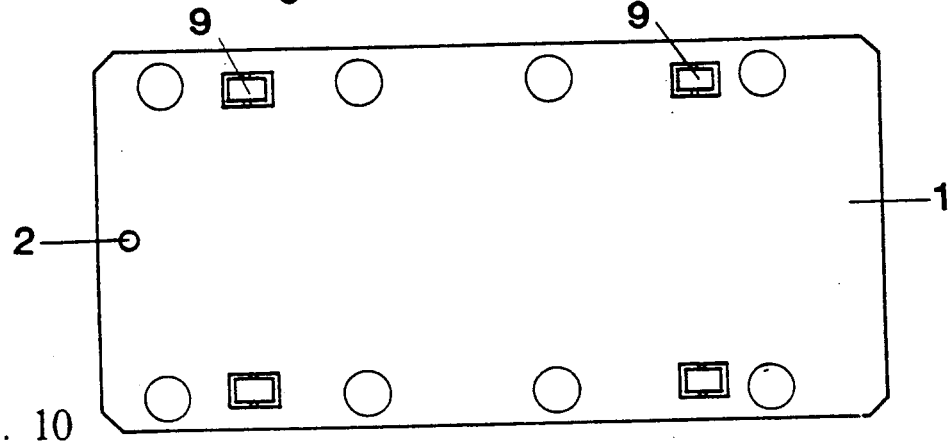
FIG. 10 is a plan view of the table top.
Figure 11:
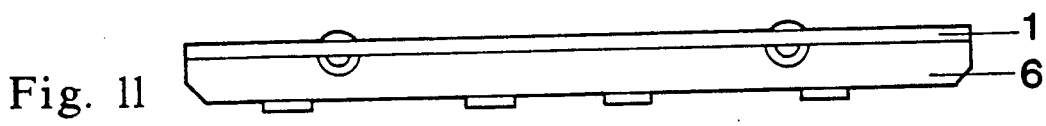
FIG. 11 is a side view of FIG. 10 with the legs folded to their retracted positions.

Referring to FIG. 1, a table/dolly/sled in accordance with the present invention is shown in its position for use as a dolly or sled and comprises a flat generally rectangular plate-like member having a broad smooth bottom surface which is raised or spaced at a substantial distance from the ground surface which becomes a top table surface when assuming the position shown in FIG. 2. Extending end to end on the upper surface as seen in FIG. 1 are two parallel rails 6 which are secured to the plate member 1 for strengthening and rigidizing or stiffening it. The rails are located near the outer elongated edges of the plate member 1 and secure wheels assemblies to the plate and provide pivotable support for leg structures which enable the device to be inverted and used as a table as seen in FIG. 2.

The table leg structures comprise four legs 4 in two pairs at opposite ends of the device. The legs 4 of each pair are interconnected by a pair of cross braces 3 and a further reinforcing cross bar 5 between the ends of the legs. The brace 3 and bar 5 at the ends of the legs provide a large flotation area to keep the legs from sinking into loose sand when the device is used as a table on a beach.

As seen in FIG. 8, each leg is pivotably supported on a respective rail 6 by means of a flat-headed bolt 16 having an unthreaded portion extending through coaxial holes in the leg 4 and in the rail 6 with a short threaded portion extending beyond the rail 6 with a washer and self-locking nut secured thereon. The unthreaded portions of bolt 16 within the parts 4 and 6 reduce the wear in the holes of these members which would occur in the case of threaded bolt portions in these holes. The counterclockwise pivoted movement of the leg 4 as seen in FIG. 8 is limited by engagement of the lower end of the leg with the upper surface of the plate 1 and by engagement of the cross bar 3 with the upper surface of the rail 6.

Figure 12:
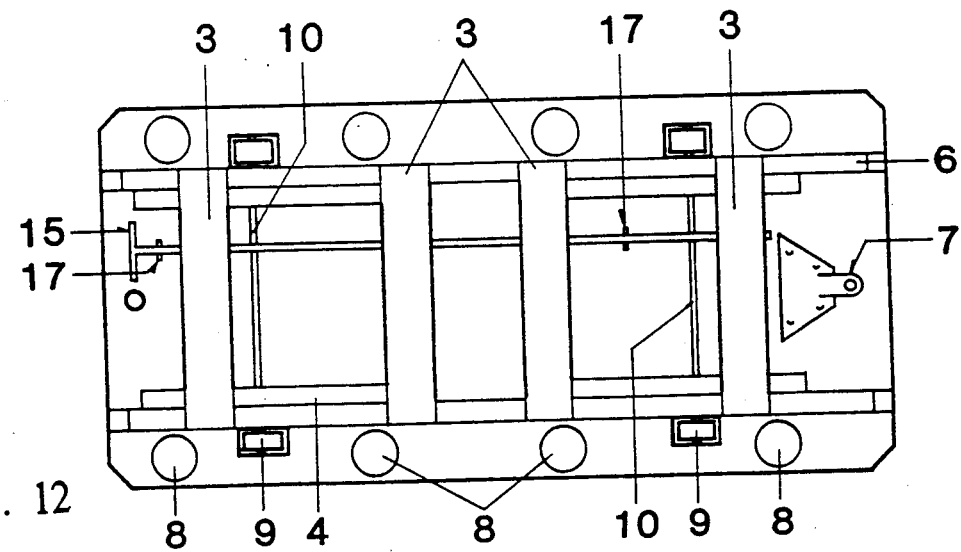
FIG. 12 is a view of the underside of FIG. 11 or the top side of FIG. 9 with the pulling handle shown in its stowed position.

As seen in FIGS. 1, 3 and 12 the wheels 9 are supported on the ends of removable axles 10. The free-floating axle 10 is held close and parallel to the plate 1 at each side of the carrier in a notch in the side of rail 6 which faces the plate 1 as seen in FIG. 3. Each wheel is located in an aperture in the plate 1 so that its lower or rolling surface extends only a slight distance below the lower sliding surface of the plate 1. Except for the slight projection of the wheels from the broad smooth flat sliding surface, this surface is unobstructed. Each wheel is spaced from the rail 6 and the inner edge of the aperture in plate 1 by a friction reducing washer 11. Each wheel is retained on the end of the axle by a spacing collar which in turn is held in place by a spring clip having one part extending through a transverse hole in the axle and another part engaging the outer surface of the axle to retain the clip in the position shown in FIG. 3. The wheels are provided with bearings 13 to reduce rolling friction thereat.

At the forward topside of the device as seen in FIGS. 1 and 12 is mounted a metal towing bracket 7 as seen in FIG. 7. This bracket is bolted to the plate 1 and has a raised forwardly projecting tongue 7' with a hole therein to receive a hook portion at one end of an elongated T-shaped metal pulling handle 15 shown in FIG. 6. The handle is removable from the tongue 7' by manipulating a spring biased slide member 15' to open the hook for removal from the hole in tongue 7'. Upon removal the handle may be stowed in spring clips 17, of a configuration shown in FIG. 5, secured between the rails 6 as seen in FIG. 12.

The table top has a plurality of annular recesses 8 in its top surface to retain therein tapered food or beverage containers when the device is functioning as a table. If desired, these recesses can be provided with underlying plates suspended a short distance, approximating the height of rails 6, below the plate 1 to hold in the recesses containers which do not precisely fit the annular recesses for retention therein.

The table top dimensions are approximately 20 by 42 inches with a thickness of the plate 1 of ½ inch. Plate 6 is made from a sturdy weatherproof plywood. The rails 6 are about 1¼ inches thick and 2½ inches high.

The wheels for the device are preferably rollerskate or skateboard wheels having diameters in the range from approximately 55 to 72 millimeters and are mounted on steel axles of 7 or 8 millimeters diameter. With an axle of 8 millimeters diameter this range of wheel diameters provides projections of the wheels above the sliding surface of the plate 1 in a range of approximately 11 to 20 millimeters.

A hole 2 is provided in the center rear portion of the plate 1 to enable two carriers to be tied together end to end using a line passing through the hole 2 and the hole in the bracket tongue 7'.

The rails 6 and the parts 3-5 of the leg assemblies are made of a strong hardwood and are secured together in the illustrated configuration using screw or bolt fasteners. The rails are similarly secured to the plate 1 with such fasteners having flat heads in countersunk recesses in the plate 1 so that the heads are flush with the smooth sliding surface of the plate. To provide further strength, a water resistant epoxy or other adhesive may be used where non-movable wood surfaces abut each other. The wood parts are finished with a suitable wear and weather resistant coating. The sliding surface may be covered with a layer of high density polyethylene plastic or similar material with a high degree of abrasion resistance a low coeficient of friction.

To facilitate carrying the carrier device up or down stairs, elongated bars, extending beyond both ends of the carrier, may be passed beneath the upper or lower bars 3 of the leg assemblies so that the carrier can be carried like a stretcher. The elongated bars as well as the transverse bars 3 may have mating notches to keep the parts from sliding relative to each other while carrying a load, particularly when the carrier is tilted slightly from side-to-side or end-to-end.

To further facilitate sliding movement of the carrier over sand, the front edge of the plate 1 may be upwardly bevelled, bent or inclined with respect to the bottom sliding surface. The rails may be beveled or shaped to accommodate and support such an inclined portion of approximately 2 to 3 inches which may be mitered to the main portion of the plate 1 at an angle of approximately 30 degrees, for example.

The wheels at the front end of the carrier when mounted on a single fixed axle as shown make it difficult to use the device as a dolly for a heavy load in a small space such as in a basement. In such case one centrally located front wheel or two front wheels spaced laterally as shown can each be supported in a box depending from the top plate 1 between the rails 6 or alongside thereof. A box for a centrally located swiveling wheel may be located at the location of the bracket 7 and may have an apertured tongue extension cut and bent out of a side thereof serving the function of tongue 7'. Such a box may be a five-sided metal generally cubical box with flanges around its one open side to secure it to the plate 1. One of the rails 6 and plate 1 may form two sides of such a box. A conventional swiveled wheel with a flat mounting plate normal to the swiveling axis can have its plate secured to the side of the box which is parallel to and spaced from the surface of plate 1. A strong thin-walled metal four-sided shell can be positioned over each front wheel position and provided with flanges for securing it to and complementing portions of a rail 6 and plate 1 to form a generally cubical box to enclose and support a swiveled wheel at each of these front wheel locations. As an alternative, a conventional easily detachable swiveled wheel having a stem for swiveling support can be provided with a stem socket similarly secured to that box side which is spaced from and parallel to the plate 1. For swiveled wheels the apertures in the plate 1 are enlarged and made annular to accommodate swiveling movement. The height of the rolling surfaces of such swiveled wheels would similarly project only a slight distance outwardly from the smooth sliding surface of the top plate 1.

Other variations within the scope of this invention will be apparent from the described embodiment and it is intended that the present descriptions be illustrative of the inventive features encompassed by the appended claims.

What is claimed is:

1. A combined beach table, dolly and sled structure comprising a table top having a broad flat smooth surface providing in an erect position of said structure an upper top table surface spaced at a substantial distance from a ground surface upon which said structure rests and in an inverted position of said structure a sliding bottom surface for contact with a granular beach surface to provide for sliding movement of said structure when said structure is dragged over said granular beach surface, table leg members secured to said table top for supporting said structure as a table, a plurality of wheels secured to said table top, means for supporting each said wheel with respect to the table top with a rolling surface of the wheel extending only slightly above said smooth top surface, said wheels being located to support said structure for rolling movement over a flat hard surface when the structure is in said inverted position, said top table surface being unobstructed except for the slight extension of the wheels above said top table surface to facilitate sliding this surface over the granular beach surface when the top table surface is inverted and used as a sliding bottom surface.

2. A structure according to claim 1 wherein at least two of said wheels are skateboard or rollerskate wheels.

3. A structure according to claim 2 wherein said two wheels are supported at opposite sides of said structure on a single axle.

4. A structure according to claim 1 including an elongated handle removably secured thereto for pulling said structure when it is in said inverted position.

5. A structure according to claim 1 including recess means in said top table surface for retaining food or beverage containers at said top table surface.

6. A structure according to claim 1 including means for supporting said table leg members for movement between extended table top supporting positions and stowed positions adjacent the table top.

7. A structure according to claim 1 wherein at least one wheel at one end of said structure is a swiveled wheel.

8. A combined beach table, dolly and sled structure comprising a table top having a broad flat smooth surface providing in an erect position of said structure an upper table top surface and in an inverted position of said structure a bottom sliding surface for dragging said structure over a granular beach surface, foldable table leg members secured to said table top and movable between extended table supporting positions and retracted storage positions, a plurality of apertures in said table top surface, a wheel in each of said apertures, means for supporting each said wheel with respect to the top with a rolling surface of the wheel extending only slightly above said smooth top surface, said wheels being located to support said structure for rolling movement over a flat hard surface when the structure is inverted, said top table surface being unobstructed except for the slight extension of the wheels above said top table surface to facilitate sliding this surface over the granular beach surface when the top table surface is inverted and used as a sliding bottom surface.

9. A structure according to claim 8 wherein at least two of said wheels are skateboard or rollerskate wheels.

10. A structure according to claim 9 wherein said two wheels are supported at opposite sides of said structure on a single removable axle.

11. A structure according to claim 8 including an elongated handle removably secured thereto for pulling said structure when it is in said inverted position.

12. A structure according to claim 11 including means for storing said handle beneath the table top when the structure is in its erect position.

13. A structure according to claim 8 including recess means in said top table surface for retaining food or beverage containers at said top table surface.

14. A structure according to claim 8 wherein at least one wheel at one end of said structure is a swiveled wheel.

15. A combined beach table, dolly and sled structure comprising a table top having a broad flat smooth surface providing in an erect position of said structure an upper table top surface and in an inverted position of said structure a bottom sliding surface for dragging said structure over a granular beach surface, foldable table leg members and means for securing said leg members to said table top, said leg members being movable between extended table supporting positions and retracted storage positions, a plurality of apertures in said top surface, a wheel in each of said apertures, means for supporting each said wheel with respect to the table top with a rolling surface of the wheel extending only slightly above said smooth top surface, said wheels being located to support said structure for rolling movement over a flat hard surface when the structure is inverted, said top table surface being unobstructed except for the slight extension of the wheels above said top table surface to facilitate sliding this surface over the granular beach surface when the top table surface is inverted and used as a sliding bottom surface, said wheel supporting means comprising at least one axle and a pair of rails for supporting said axle relative to said table top, said rails forming part of said means for securing said leg members to said table top.

16. A structure according to claim 15 wherein at least two of said wheels are skateboard or rollerskate wheels.

17. A structure according to claim 16 wherein said two wheels are supported at opposite sides of said structure on a single axle.

18. A structure according to claim 15 including a handle removably secured thereto for pulling said structure when it is in said inverted position.

19. A structure according to claim 15 including recess means in said top table surface for retaining food or beverage containers at said top table surface.

20. A structure according to claim 15 wherein at least one wheel at one end of said structure is a swiveled wheel.

* * * * *